April 22, 1930. E. W. WEED 1,755,854
GRAPPLE AND BASKET FOR WAGON LOADING APPARATUS
Original Filed Nov. 18, 1926  2 Sheets-Sheet 1
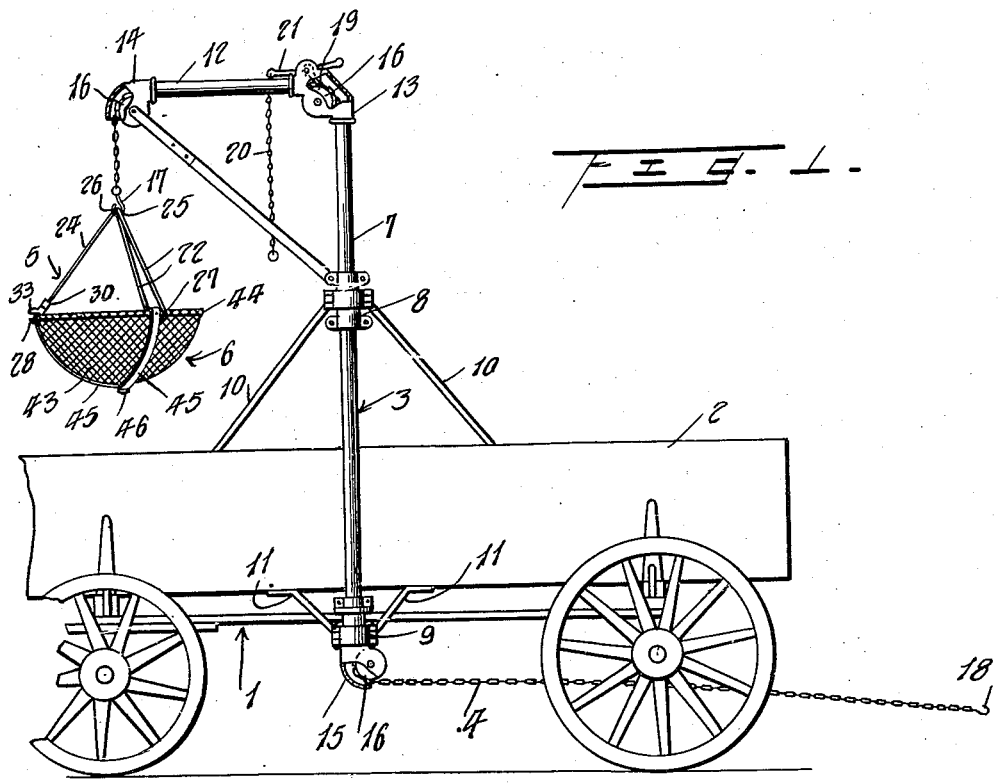
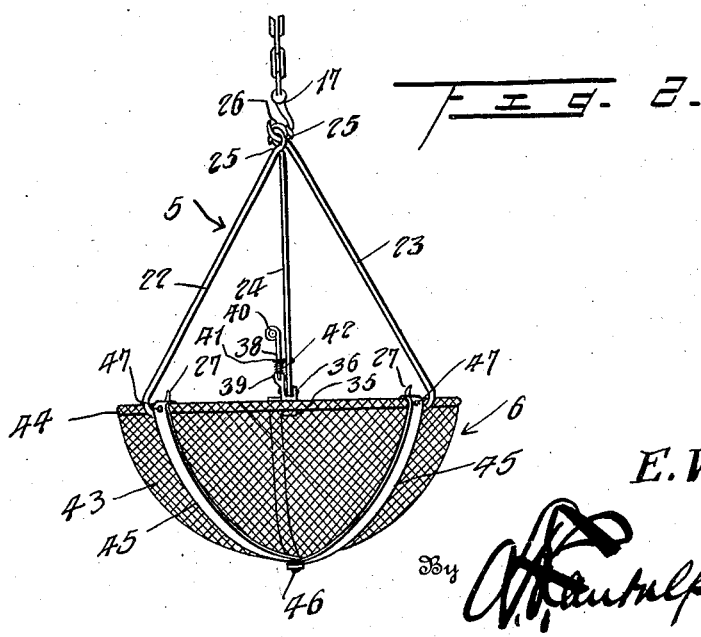
Inventor
E. W. Weed.

April 22, 1930. E. W. WEED 1,755,854
GRAPPLE AND BASKET FOR WAGON LOADING APPARATUS
Original Filed Nov. 18, 1926  2 Sheets-Sheet 2
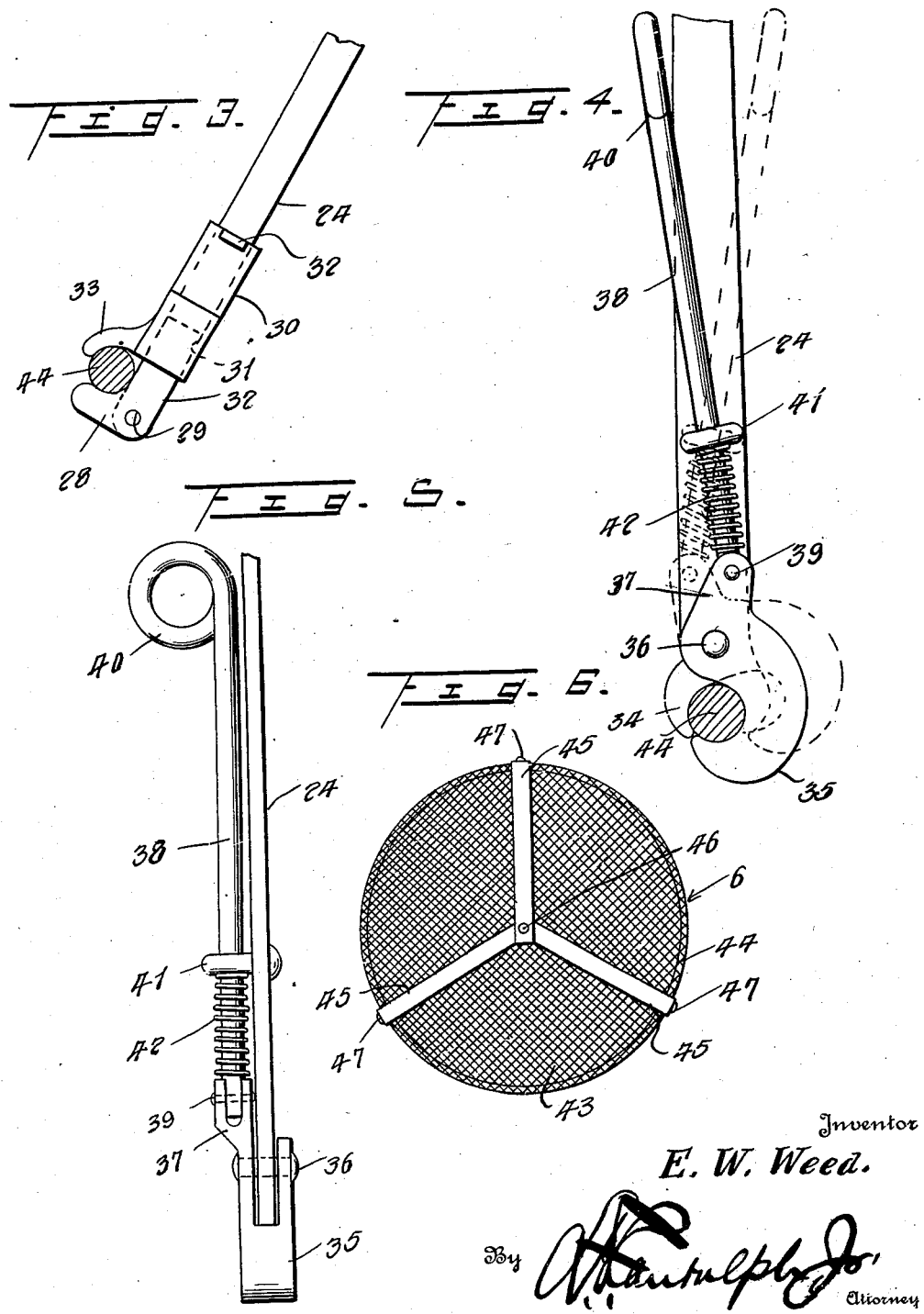
Inventor
E. W. Weed.

Patented Apr. 22, 1930

1,755,854

UNITED STATES PATENT OFFICE

EMIL W. WEED, OF RAYMOND, ALBERTA, CANADA

GRAPPLE AND BASKET FOR WAGON-LOADING APPARATUS

Original application filed November 18, 1926, Serial No. 149,235. Divided and this application filed March 15, 1928. Serial No. 261,856.

This application constitutes a division of my co-pending application for wagon loading apparatus, filed November 18, 1926, serially numbered 149,235, and allowed August 17, 1927. The apparatus embodies a crane mounted on the wagon, a grapple secured to the load end of the cable of the crane and adapted to be engaged with a basket, means by which the power end of the cable may be connected to a draft animal so as to permit the basket to be raised into dumping position while the wagon is at rest, and means by which the power end of the cable may be connected to the ground so as to permit the basket to be raised into dumping position during and as the result of the movement of the wagon.

The present application relates to the grapple which embodies a plurality of rods provided with hooks adapted to engage the basket, the hook of one of the rods being mounted for movement from a retaining into a releasing position so as to permit the basket to tilt on the remaining hooks and discharge its contents into the wagon, and means for releasably holding the movable hook in retaining position.

The present application also relates to a novel form of basket, this part being strong and durable and so constructed as to permit the grapple hooks to be readily engaged therewith and disengaged therefrom.

The grapple and basket are hereinafter more fully described and claimed, and illustrated in the accompanying drawings, wherein:

Figure 1 is an elevational view of a wagon equipped with the loading apparatus,

Figure 2 is a view in rear elevation of the grapple and basket,

Figure 3 is a view in side elevation of one form of the movable grapple hook and the means for releasably holding it in retaining position, Figure 4 is a view similar to Figure 3 illustrating a slightly modified form of the movable grapple hook and the means for holding it in retaining position, Figure 5 is a view in rear elevation of the structure shown in Figure 4, and Figure 6 is a bottom plan view of the basket.

Referring in detail to the drawings, 1 designates the running gear and 2 the body of the wagon. 3 designates the crane, 4 the cable of the crane, 5 the grapple secured to the load end of the cable, and 6 the basket engaged by the grapple. The means by which the power end of the cable may be connected to a draft animal and the means by which it may be connected or anchored to the ground are not shown.

The crane 3 comprises a hollow post 7 which extends above and below the wagon bed 2 and is supported for rotation about a vertical axis by bearings 8 and 9. The bearing 8 is supported above and from the wagon bed 2 by bracket arms 10, and the bearing 9 is supported below and from the wagon bed by bracket arms 11. A hollow and horizontally disposed arm 12 extends from the upper end of the post 7 and is secured thereto by a hollow coupling 13. A housing 14 is secured to the forward end of the arm 12, and a housing 15 is rotatably associated with the lower end of the post 7. Pulleys 16 are journaled in the coupling 13 and housings 14 and 15. The cable 4 passes through the post 7 and arm 12 about the pulleys 16, and it is provided at its load end with a hook 17 for engagement with the grapple 5 and at its power end with a hook 18 for engagement with either of the means for connecting it to the draft animal or to the means for connecting or anchoring it to the ground.

The cable 4 is held against casual movement in load lowering direction by a dog 19 pivoted within the coupling 13 for engagement with the cable. The dog 19 normally occupies an active position, and it is adapted to be moved into inactive position through the medium of a chain 20 connected to a lever 21 fixed to the pivot of the dog.

The grapple 5 consists of rear rods 22 and 23 which are relatively fixed, and a front rod 24 pivotally associated with the rear rods. The rods 22 and 23 are connected at their upper ends by a loop 25 which is removably engaged with the cable hook 17, and the rod 24 is provided at its upper end with a loop 26 which is also removably engaged with the hook. The rods 22 and 23 are provided at their lower ends with fixed basket engaging hooks 27, and the rod 24 is provided at its lower end with a pivoted basket engaging hook 28. The hook 28 is pivoted to the rod 24 as at 29, and it is held against casual movement with respect to the rod by a collar 30 which is slidably mounted upon the rod and provided with a recess 31 for the reception of the upper end of the shank 32 of the hook. The collar 30 is also provided with a laterally projecting lug 32 through the medium of which it may be raised on the rod 24 when it is desired to release the hook 28. When this hook is released, the basket 6 tilts on the rods 22 and 23 with the resulting discharge of the contents into the wagon body 2. The hooks 27 and 28 engage under the rim of the basket 6, and the sleeve 30 is provided with a hook 33 which engages over the rim of the basket.

A modified form of the means for connecting the basket 6 to the rod 24 is shown in Figures 4 and 5, and in this form thereof the means comprises a downwardly spacing hook 34 fixed to the lower end of the rod 24, and an upwardly spacing hook 35 pivoted as at 36 to said end of the rod, said hooks being adapted to engage the rim of the basket 6 as shown in Figure 4. The hook 35 is provided with an upwardly extending shank 37 to which the lower end of the rod 38 is pivotally connected, as shown at 39. The rod 38 is provided at its upper end with an eye 40, and it is slidably mounted in a bearing 41 which is rockably connected to the rod 24. A coil spring 42 which is mounted on the rod 38 between the shank 37 and eye 40, functions to normally maintain the hook 35 in closed position with respect to the hook 34. The rod 38 provides means through the medium of which the hook 35 may be swung into opened position when it is desired to release the basket 6 so that it will rock on the rods 22 and 23 and discharge its contents into the wagon body 2. To effect the opening of the hook 35, it is only necessary to swing the rod 38 into the dotted line position shown in Figure 4, and this may be done through the medium of a flexible member, not shown, connected to the eye 40.

The basket 6 comprises a substantially semi-spherical body 43 which is made from wire cloth, and an annular rim 44 which is made from a piece of round stock with its ends welded together. The body 43 has its upper edge bent over and welded or secured in any other suitable manner to the rim 44. Arcuate straps 45 are located at the outer side of the body 43 and have their lower ends connected together by a rivet 46. The upper ends of the straps 45 are bent about the rim 44, and the loops thus formed are maintained closed by rivets 47. The basket 6 is strong and durable and will when in discharging position rapidly empty its contents into the wagon body 2. The hooks of the grapple rods 22, 23 and 24 are engaged with the rim 44 close to the straps 45, as shown in Figure 5, the straps holding the hooks against movement in a direction that would result in injury to the wire cloth body 43.

The apparatus is especially adapted to permit the wagon 1 to be easily and quickly loaded in the field with sugar beets, garden truck and all other crops that may be gathered in baskets. The crops to be gathered are placed in the baskets, the loaded baskets are deposited in the field at the points where they are loaded, and the wagon 1 is driven over the field from basket to basket. With the wagon at rest, a basket is engaged by the grapple 5, and the power end of the cable 4 is anchored to the ground or connected to a draft animal. If the cable 4 is anchored to the ground the wagon 1 is set in motion, while if the cable is connected to the draft animal the wagon remains at rest and the draft animal moves, with the result that the basket will be elevated to a point above the wagon body 2, in which position it will be held by the dog 19. While the basket is in this position the pivoted hook of the grapple bar 24 is released. The resulting downward rocking of the basket on the grapple bars 22 and 23 will effect the discharge of its contents into the wagon body 2. After the contents of the basket have been discharged into the wagon body 2, the wagon 1 is moved to the next loaded basket, and when this basket is reached the dog 19 is retracted to permit the grapple 5 to be lowered into position for engagement with the basket, and thereafter the dog is released and the basket elevated into dumping position over the wagon body 2 and its contents discharged into the wagon body.

It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:—

1. A grapple comprising a plurality of rods, hooks carried by certain of the rods, a hook pivoted to the remaining rod, a semi-spherical container carried by said rods and secured to said hooks, and means releasably securing the pivoted hook in retaining position.

2. A grapple comprising a plurality of rods, hooks carried by certain of the rods, a pair of hooks carried by the remaining rod and of which one is mounted for movement with respect to the other, a semi-spherical container carried by said rods and secured to said hooks, and means for securing the movable hook in closed relation to the other.

3. A grapple comprising a plurality of rods, hooks carried by certain of the rods, a fixed and pivoted hook carried by the remaining rod, a semi-spherical container carried by said rods and secured to said hooks, and means yieldingly holding the pivoted hook in closed relation to the fixed hook.

4. A grapple comprising a plurality of rods, hooks carried by certain of the rods, a hook pivoted to the remaining rod, a bearing rockably supported by the remaining rod, a rod slidably carried by the bearing and pivotally connected to the pivoted hook, a spring surrounding the rod and terminally engaging the bearing and the pivoted hook to hold it in closed and fully open positions, and a semi-spherical container carried by said rods and secured to said hooks.

5. A grapple comprising rods having a fixed angular relation and provided with hooks, another rod pivotally associated with said first rods, a pivoted hook carried by said other rod, a semi-spherical container carried by said rods and secured to said hooks, and means releasably holding the pivoted hook in retaining position.

6. A releasable grapple hook, comprising a bar, an integral hook facing outwardly of the end of the bar, a hook member pivotally secured to said bar and having an inwardly facing hook coacting with the first hook, a shank on said hook member, a rod pivotally engaging said shank, an eye-loop rockably engaging said bar and slidably mounting said rod, and a coil spring enclosing said rod and terminally engaging said shank and eye-loop to hold the hook member in engaging and disengaging positions.

7. A beet loading device, comprising a hoisting element, three rods suspended by said element, a semi-spherical container supported by said rods, the rods being secured to said container at spaced intervals around its rim, two of said rods having hooks engaging said rim and providing pivot means for dumping the container, the third rod having a latch hook thereon engaging the rim, said latch hook including a manually actuated bar, a pivoted hook engaging said bar, a bearing for said bar rockably mounted on the rod, and a coil spring enclosing the bar and terminally engaging the hook and bearing to hold the hook in engaged and disengaged positions.

In testimony whereof I affix my signature.

EMIL W. WEED.